July 11, 1933.                A. W. HULL                 1,918,105
                      TRANSMISSION OF ELECTRIC POWER
                           Filed Feb. 25, 1930
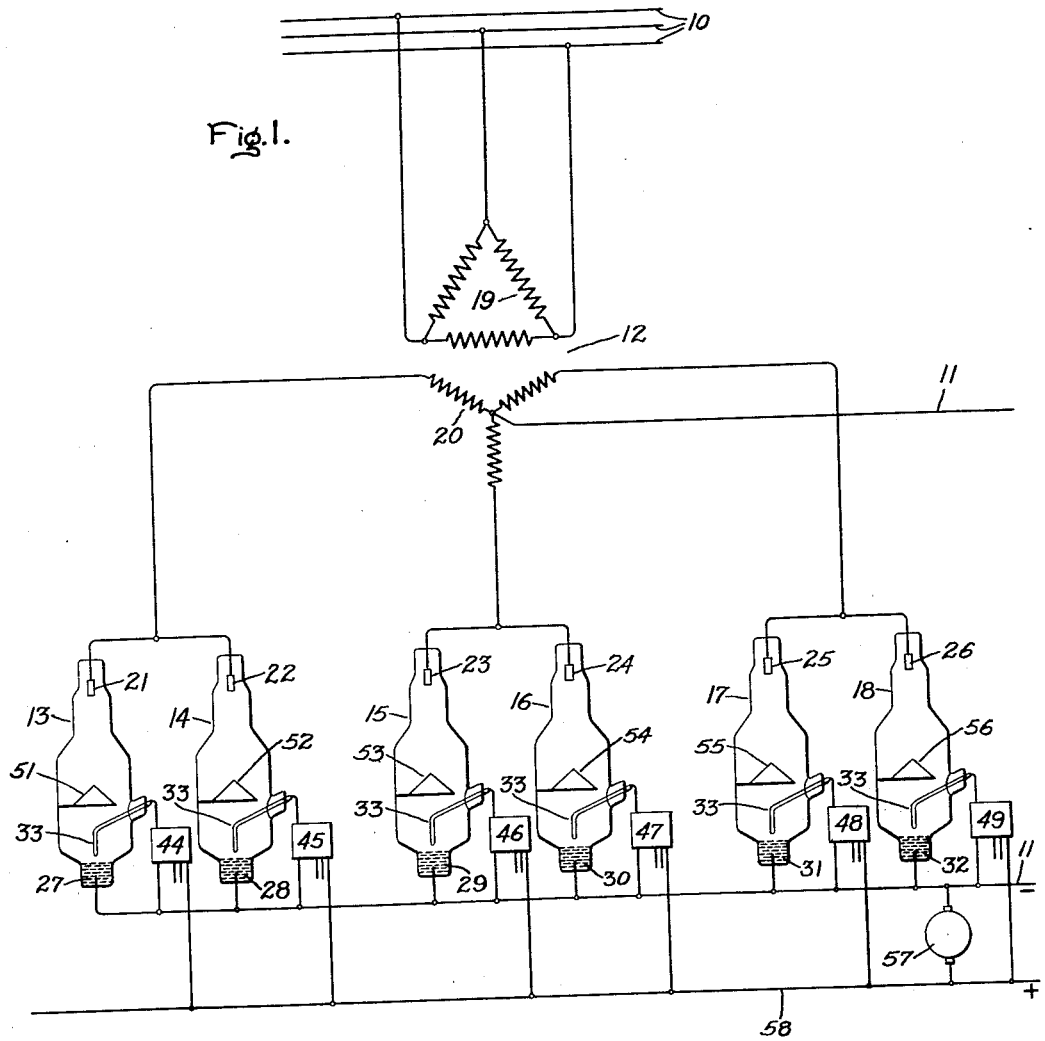
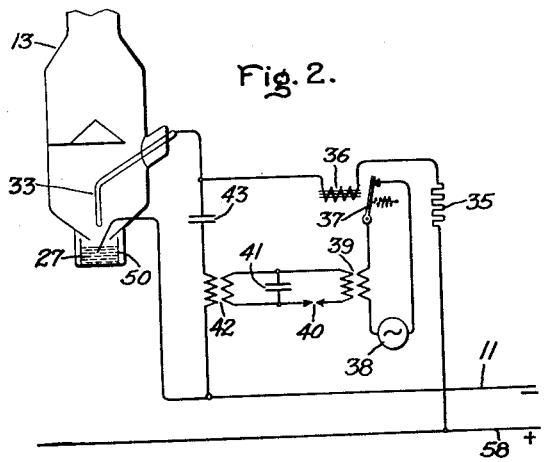
Inventor:
Albert W. Hull,
by Charles E. Tullar
His Attorney.

Patented July 11, 1933

1,918,105

UNITED STATES PATENT OFFICE

ALBERT W. HULL, OF SCHENECTADY, NEW YORK, ASSIGNOR TO GENERAL ELECTRIC COMPANY, A CORPORATION OF NEW YORK

TRANSMISSION OF ELECTRIC POWER

Application filed February 25, 1930. Serial No. 431,328.

My invention relates to the transmission of electric power between direct and alternating current circuits through apparatus including electric discharge devices, and has for its principal object the provision of an improved arrangement and method of operation whereby the deleterious effects of reverse arcs in such devices are avoided and continuous operation of the apparatus is readily maintained.

One of the chief difficulties encountered in the operation of power converting apparatus including electric discharge devices, such as the mercury arc rectifier, is the formation of destructive arcs within the rectifier or discharge device. This phenomenon is commonly known as arc-back and is likely to result in injury not only to the device itself but also to the transformer winding and other circuits interconnected with the device.

The reasons for arc-back have not been well understood in the past, and no entirely satisfactory means has been provided for preventing it or for protecting the various parts of the apparatus against the electric disturbances which it occasions. In accordance with my invention, the injurious effects of these disturbances are avoided by the provision of means including a single space discharge device or a pair of parallel-connected space discharge devices in each phase connection of the apparatus. With the parallel unit arrangement, a reverse arc in any one of the devices interrupts its excitation and its load current is transferred to the device connected in parallel with it. Thereafter the parallel-connected device may continue to carry the load current if the apparatus is operating at light load. If the apparatus is operating at full load, the device in which arc-back has occurred will assume its share of the load current when its excitation is reestablished.

In case a single device is used in each phase a reverse arc in any one of the devices interrupts the excitation of this device and thereby interrupts its load current at the end of the first half cycle of arc-back. The apparatus will thus operate with one less than its full number of phases until the excitation of the affected devices is reestablished. In this case the automatic interruption of the excitation of the arcing device serves the purpose of temporarily removing this device from the circuit by making it non-conducting, thereby avoiding the interruption of service which would occur if the arc-back continued over several cycles.

My invention will be better understood from the following description when considered in connection with the accompanying drawing and its scope will be pointed out in the accompanying claims.

Referring to the drawing, Fig. 1 is a wiring diagram of a rectifier apparatus wherein my invention has been embodied; and Fig. 2 illustrates certain details in the construction and excitation control connections of the electric discharge devices which form a part of the apparatus illustrated by Fig. 1.

The apparatus includes alternating current terminals 10 and direct current terminals 11 which are interconnected with one another through means including a transformer 12 and a plurality of electric discharge devices 13 to 18. The transformer 12 is provided with a primary winding 19 which is connected to the alternating current terminals 10 and with a secondary winding 20 which is connected through its neutral connection to the upper direct current terminals 11 and through its end terminals to the anodes 21 to 26 of the devices 13 to 18. Thus the anodes 21 and 22 of the devices 13 and 14 are connected to one phase terminal of the winding 20, the anodes 23 and 24 of the devices 15 and 16 are connected to another phase terminal of the winding 20, and the anodes 25 and 26 of the devices 17 and 18 are connected to still another phase terminal of the winding 20. The cathodes 27 to 32 of the devices 13 to 18 respectively are connected to the lower direct current terminal 11. If the tanks of the devices 13 to 18 are made of conductive material it is of course essential that means for insulating the various electrode leads from the tank be provided.

Excitation for the devices 13 to 18 is supplied from a source 57 this source being connected between the lower direct current terminal 11 and an excitation bus 58 which is connected to the exciting electrodes 33 of the devices 13 to 18. As indicated more clearly in Fig. 2, a resistance element 35 and the operating coil 36 of a switch 37 are interposed between each exciting electrode and the excitation bus 58.

The switch 37 is part of a group of cooperating elements whereby the excitation of the electric discharge device is automatically started or reestablished after it has been interrupted by arc-back of the device. This group of cooperating elements includes an alternating current source 38, a transformer 39, a spark gap 40, a condenser 41, a transformer 42 and a condenser 43. Its function is to subject the exciting electrode of the device to a high frequency potential which ionizes the gas between the cathode and starting electrode and allows the exciting arc to be established. When the exciting arc is established, it is maintained by the source 57, the switch 37 is operated to its open position and the starting means are deenergized. Current for the starting means of all the devices may be supplied from a single alternating current source, such as the terminals 10.

In Fig. 1 the means for initiating the excitation of the devices 13 to 18 are indicated by the reference numerals 44 to 49. Each of these reference numerals is intended to represent a group of cooperating elements similar to that of Fig. 2 or capable of performing the same functions as this group of elements. As will be readily understood, any suitable starting means may be substituted for that illustrated by Fig. 2. It is desirable that each of the cathodes 27 to 32 be insulated from the evacuated vessel as indicated in Fig. 2 by an insulation cup 50 and that shielding means such as the members 51 to 56 be provided for protecting the anodes 21 to 26 from the vapors ejected from the cathodes 27 to 32.

Assuming the transformer 12 and the excitation bus 58 to be energized and the switch 37 to be closed, the excitation electrodes of the devices are subjected to a high frequency potential which permits starting of the excitation by current supplied from the source 57. When excitation of the devices 13 to 18 is established, load current is transmitted between the alternating current terminals 10 and the direct current terminals 11 in a manner which is well understood.

While the load current is comparatively low in value, the current in each phase is carried by one or the other of the parallel-connected devices. At heavy loads, the current is divided between the parallel connected devices of which there may be two or any other suitable number.

If a reverse arc occurs in any of the devices 13 to 18, it has been found that the current flowing in the associated excitation circuit is instantly interrupted. This is probably due to the fact that the intense electrostatic field in the neighborhood of the cathode spot, which is necessary to maintain the ionizing arc, is reversed in polarity under arc back conditions when the cathode becomes highly electro-positive.

The reverse arc will continue to flow for the remainder of the first half cycle but as the anode potential of the affected device reverses polarity, it has been found that the cathode becomes deionized so that an arc cannot restart in the device in the normal direction. The result is that the load current is shifted to the parallel connected device in the same phase as the affected device. The switch member 37 will operate to its right position under the pull of the bias spring as soon as the current is interrupted in the main excitation circuit. However, the time required for the operation of this switch will normally correspond to several cycles of anode potential of the affected device and may, of course, be made any desired time interval by any well known expedient. During the time required for the operation of the switch 37 the affected device will have regained its normal operating conditions so that when the excitation circuit is again energized from the high frequency oscillation circuit supplied by the transformer 42, the device in which current has been interrupted will again be in condition to rectify the load current. If the apparatus is operating at light load, the load current is thereafter carried by the device to which it has been shifted. If the load of the apparatus is heavy, the load current is divided between the different parallel-connected devices as soon as the excitation of the affected device is reestablished.

As will be readily understood, the parallel-connected unit system herein disclosed has the advantage that interruption of operation due to arc-back is avoided. It has the further advantage that the load capacity of the apparatus may be increased or decreased as desired by changing the number of parallel-connected devices in each phase of the apparatus. However, it will be well understood by those skilled in the art that in case it is permissible to operate with one of the phases of a polyphase rectifier disconnected only a single vapor electric device need be included in each phase.

What I claim as new and desire to secure by Letters Patent of the United States, is:

1. The combination of a pair of parallel-connected vapor electric devices each provided with a cathode, an anode and an exciting electrode, excitation means connected between each of said cathodes and the corresponding exciting electrodes, means including a winding and direct current circuit terminals connected between said anodes and cathodes, and means responsive to a reverse arc in each of said devices for interrupting the associated excitation means.

2. The method of operating a pair of parallel-connected vapor electric devices which includes establishing the excitation of said devices, transmitting current through one of said devices, and interrupting the excitation of said current transmitting device in response to a reverse arc therethrough whereby said current is transferred to the other of said devices.

3. The method of operating a pair of parallel-connected vapor electric devices which includes establishing the excitation of said devices, transmitting current through one of said devices, interrupting the excitation of said current transmitting device to cause said current to be transferred to the other of said devices, and reestablishing said interrupted excitation.

4. The method of operating a pair of parallel-connected vapor electric devices subject to reverse arcs which includes establishing the excitation of said devices, transmitting current through one of said devices, interrupting the excitation of said current transmitting devices in response to a reverse arc therein whereby said current is transferred to another of said devices.

5. The combination of a plurality of vapor electric devices each provided with a cathode and anode, a winding provided with end terminals connected to the anodes of said devices and with a neutral connection, direct current terminals connected respectively to said neutral connection and to the cathodes of said devices, and separate excitation means associated with each of said devices and arranged to be deenergized in response to reverse arcs in the device with which it is associated.

6. The combination of a pair of parallel-connected vapor electric discharge devices each provided with a cathode, an anode and an exciting electrode, excitation means connected between each of said cathodes and the corresponding exciting electrodes, means including a winding and direct current circuit terminals connected between said anodes and cathodes, and means responsive to a reverse arc in each of said devices for interrupting the associated excitation means until normal conditions are reestablished in said device.

7. The combination of a pair of parallel-connected vapor electric discharge devices each provided with a cathode, an anode and an exciting electrode, excitation means connected between each of said cathodes and the corresponding exciting electrodes, means including a winding and direct current circuit terminals connected between said anodes and cathodes, and means responsive to a reverse arc in each of said devices for interrupting the associated excitation means and thereafter automatically reestablishing said excitation means.

8. The combination of a polyphase rectifier including a vapor electric device for each phase, an excitation circuit for each of said devices, and means responsive to a reverse arc in any device for interrupting the associated excitation means.

9. The combination of a unidirectional electric translating circuit, a vapor electric device included in said circuit, an excitation circuit for said device and means responsive to a reverse arc in said device for interrupting said excitation means.

10. The combination of a unidirectional electric translating circuit, a vapor electric device included in said circuit, an excitation circuit for said device, and means responsive to a reverse arc in said device for interrupting said excitation means and thereafter automatically reestablishing said excitation circuit.

In witness whereof I have hereunto set my hand this 24th day of February, 1930.

ALBERT W. HULL.